US008775251B1

(12) United States Patent
Archak et al.

(10) Patent No.: US 8,775,251 B1
(45) Date of Patent: Jul. 8, 2014

(54) ALLOCATING ADVERTISING BUDGETS

(75) Inventors: Nikolay Archak, Jersey City, NJ (US); Seyed Vahab Mirrokni Banadaki, New York, NY (US); Shanmugavelayutham Muthukrishnan, New York, NY (US)

(73) Assignee: Google Inc., Mountain View, CA (US)

( * ) Notice: Subject to any disclaimer, the term of this patent is extended or adjusted under 35 U.S.C. 154(b) by 364 days.

(21) Appl. No.: 13/150,365

(22) Filed: Jun. 1, 2011

Related U.S. Application Data (60) Provisional application No. 61/350,375, filed on Jun. 1, 2010.

(51) Int. Cl.
*G06Q 30/00* (2012.01)
(52) U.S. Cl.
USPC ............... 705/14.42; 705/14.13; 707/765; 707/766
(58) Field of Classification Search
USPC ............... 705/14.42, 14.13; 707/765, 766
See application file for complete search history.

(56) References Cited

U.S. PATENT DOCUMENTS

| 5,659,732 A * | 8/1997 | Kirsch ................................. 1/1 |
| 2008/0004947 A1 * | 1/2008 | Mathew et al. ................ 705/14 |

FOREIGN PATENT DOCUMENTS

WO   WO2006099105   *   9/2006   ............ G06Q 30/00

* cited by examiner

*Primary Examiner* — John Van Bramer
(74) *Attorney, Agent, or Firm* — Leason Ellis LLP (57) ABSTRACT

Methods, systems, and apparatus for allocating advertising budgets. In one aspect, a method includes receiving a set of candidate keywords specifying targeting keywords for content items. Each targeting keyword can be a phrase to be matched for a content item to be eligible to be provided in response to a content item request. For each of the targeting keywords, a probability distribution specifying likelihoods of specified user actions occurring in response to a content item is received. Based on the probability distributions, a set of final keywords with which distribution of the content items will be controlled is selected, the set of final keywords being one or more keywords for which a likelihood of a specified outcome occurring exceeds a threshold likelihood. The set of final keywords is a set which a total cost of distributing the content items is below a specified value.

20 Claims, 4 Drawing Sheets

ALLOCATING ADVERTISING BUDGETS

BACKGROUND

This application relates to and claims the benefit of U.S. provisional patent application Ser. 61/350,375, filed Jun. 1, 2010, incorporated here by reference in its entirety.

This specification relates to data processing.

The Internet provides access to a wide variety of resources. For example, video and/or audio files, as well as web pages for particular subjects or particular news articles are accessible over the Internet. Access to these resources presents opportunities for advertisements (or other sponsored content items) to be provided with the resources. For example, a web page can include "slots" (i.e., pre-defined portions of the web page) in which advertisements (or other content items) can be presented. These slots can be defined in the web page or defined for presentation with a web page, for example, in a pop-up window.

Advertisement slots can be allocated to advertisers through an auction. For example, advertisers can provide bids specifying amounts that the advertisers are respectively willing to pay for presentation of their advertisements. In turn, an auction can be performed and the advertisement slots can be allocated to advertisers according to their bids. When one advertisement slot is being allocated in the auction, the advertisement slot can be allocated to the advertiser that provided the highest bid. When multiple advertisement slots are allocated in a single auction, the advertisement slots can be allocated to set of bidders that provided the highest bids.

Content items that are presented in slots of a resource can be selected for presentation by a content distribution system. The content distribution system receives content requests for content items (e.g., advertisements, video, audio or other content items) to be provided with a resource and selects a content item provider to provide a content item in response to the request. The content item request can be a request for advertisements to be provided with search results. For example, when a search query is submitted by a user, the content item request is generated and transmitted to a content distribution system that selects advertisements for presentation with the search results. The advertisement management system selects advertisements, for example, based on characteristics of the search query, such as keywords that are matched by the search query, as well as bids that are associated with (e.g., indexed according to and/or stored with a reference to) the keywords by the advertisers.

Advertisement management accounts can enable advertisers to specify keywords and corresponding bids that are used to control allocation of their advertisements. The advertiser can also track the performance of advertisements that are provided using the keywords and corresponding bids. For example, an advertiser can access the advertisement management account and view performance measures corresponding to the advertiser's advertisements that were distributed using each keyword. In turn, the advertiser can adjust settings that control the allocation of advertisements and compare the performance measures for the advertisements that are allocated using the new settings.

SUMMARY

In general, one innovative aspect of the subject matter described in this specification can be embodied in methods that include the actions of receiving, from a content distributor, a set of candidate keywords specifying targeting keywords for one or more content items, each targeting keyword being a phrase to be matched for a content item to be eligible to be provided in response to a content item request; receiving, for each of the targeting keywords, a probability distribution specifying likelihoods of specified user actions occurring in response to a content item being distributed based, at least in part, on the targeting keyword being matched by a content item request; and selecting, based on the probability distributions, a set of final keywords with which distribution of the one or more content items will be controlled, the set of final keywords being one or more keywords for which a likelihood of a specified outcome occurring exceeds a threshold likelihood, and the set of final keywords being a set of the candidate keywords for which a total cost of distributing the content items is below a specified value. Other embodiments of this aspect include corresponding systems, apparatus, and computer programs, configured to perform the actions of the methods, encoded on computer storage devices.

These and other embodiments can each optionally include one or more of the following features. Selecting a set of final keywords can include selecting a set of final keywords that, based on the probability distributions, will provide at least a threshold conversion rate.

Methods can further include the actions of computing, based on the probability distribution, a marginal value that will result in response to increasing a bid amount for at least one of the candidate targeting keywords, where selecting the set of final keywords can include selecting the set of final keywords that will result in a highest marginal value.

Methods can further include the actions of selecting, based on the probability distribution, corresponding bid amounts for each of the selected final keywords.

Receiving a probability distribution can include receiving data indicating a likelihood that a user performs a conversion following presentation of an advertisement that is provided based, at least in part, on the targeting keyword being matched by a search query.

The likelihood that the user performs the conversion can be based, at least in part, on whether the user was previously presented with an advertisement in response to a different targeting keyword being matched by a search query.

Methods can further include the actions of receiving a content item request that includes data that match a keyword in the final set of keywords and providing an advertisement that is targeted using the final set of keywords.

Methods can further include the actions of determining a user state for a user for which the content item request was received, the user state specifying at least one search query that was previously submitted by the user and determining, based on the user state and the probability distribution, the likelihood of the specified outcome occurring following presentation of an advertisement that is targeted using the final set of keywords.

Selecting a set of final keywords can include determining for each of a plurality of proper subset of the set of candidate keywords, a marginal value that will be provided by selecting the proper subset as the set of final keywords and selecting, as the set of final keywords, the proper subset that provides a highest marginal value.

Particular embodiments of the subject matter described in this specification can be implemented so as to realize one or more of the following advantages. The carryover effect that a bid on one keyword has on another keyword can be taken into consideration when measuring the effectiveness of keyword bidding. As the carryover effect is included in the effectiveness measurement of an advertising campaign, the advertising budget allocated to the campaign can be more effectively allocated among possible target keywords.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Advertisements (also referred to herein as "ads") and other content items can be provided with search results pages and/or other resources based, at least in part, on targeting keywords for the advertisements being matched by information included in an content item request. Units of content that are presented in (or with) resources are referred to as content items. For example, as described in more detail below, an advertisement can be provided when a search query for which search results are being provided (or a resource keyword for a resource) is determined to match the targeting keyword for the advertisement.

Advertisers can assign bids of varying amounts to different targeting keywords. When a content item request includes information that matches one of the targeting keywords, the bid that the advertiser has assigned to the targeting keyword is used in an auction. When an auction is used to select ads to be provided in response to a content item request, the likelihood that the advertisement is provided is generally proportional to the bid that has been assigned to the keyword that was matched. However, as the advertiser increases its bid on a particular keyword, the amount of money that the advertiser can bid on other keywords can be reduced.

A goal of advertising can be obtaining a conversion, or in other words, having a user perform an advertiser specified action after the advertisement has been presented with a resource or search results page. For example, a conversion can be a user purchasing a product advertised by the ad. A presentation of an ad, however, might not always result in a conversion. The advertiser thus has to decide how much of the advertising budget to spend on which keywords in order to achieve at least a threshold number of conversions, given a finite amount of money in the advertising budget.

The advertiser can receive data that provides some feedback on the effectiveness of specific advertisements on specific keywords. For example, the advertiser can be provided statistics, such as click-through rate (CTR), which can provide the advertiser with a sense of how many users who see an ad click on the ad. The advertiser can also receive information on conversion rates (e.g., how frequently users who click on ad continue on to purchase a product or service advertised by the ad). Using this information, advertisers can gauge an effectiveness of an ad and select bid amounts for particular keywords based on the effectiveness of advertisements that were distributed based on the particular keywords being matched.

In some cases, statistics for ads that are presented using a particular keyword (e.g., a phrase of one or more words) might provide an incomplete picture of the effectiveness of the keyword, and therefore provide a suboptimal budgeting strategy. For example, a retailer, Example Retailer, can sell a product, widgets, of a certain brand, BrandWidgets. The retailer can bid on keywords, including "widgets," "Example Retailer," and "BrandWidgets." The users who search on "Example Retailer" might be more likely to purchase a widget from Example Retailer. Therefore, the conversion rate for a bid on "Example Retailer" might be higher than the conversion rate for Example Retailer for a bid on "widgets" or "BrandWidgets." Furthermore, since competition for bidding on "Example Retailer" will likely be lower than the competition for "BrandWidgets," the cost might also be lower to bid on "Example Retailer." In this example, the retailer might determine that they should allocate more of the advertising budget to the keyword Example Retailer, since this keyword appears to have a higher conversion rate.

If the retailer in this example spends the majority of an advertising budget on "Example Retailer" as a result of this information, the retailer might miss out on the advertising exposure that is obtained by bidding on "widgets" or "BrandWidgets." For example, "widgets" and "BrandWidgets" might not necessarily result in either clicks or conversions when an advertisement is provided in response to search queries that match these targeting keywords. However, the advertisements that are provided in response to these keywords might inform users of the fact that Example Retailer sells BrandWidgets, and the users might later submit the search query "Example Retailer," and complete a purchase.

In some implementations, an advertising budget can be allocated based, at least in part, on the effect that bidding on one keyword has on the bidding of another keyword. Using the above example, the effect of bidding on "BrandWidgets" (e.g., the exposure of Example Retailer as a source of BrandWidgets) can be taken into consideration when analyzing the effectiveness (e.g., the conversion rate) of "Example Retailer," as a targeting keyword.

The effect that a content item has on the effectiveness of subsequently presented content items is referred to as carryover effect. The carryover effect for a content item (e.g., an advertisement) is indicative of the increased likelihood of a specified outcome (e.g., that a user will perform an action that constitutes a conversion) based on the exposure to the content item. As described in more detail below, a budget management apparatus can allocate an advertising budget among candidate keywords based, at least in part, on the carryover effect that is provided by advertisements that are targeted to the keywords.

Figure 1:
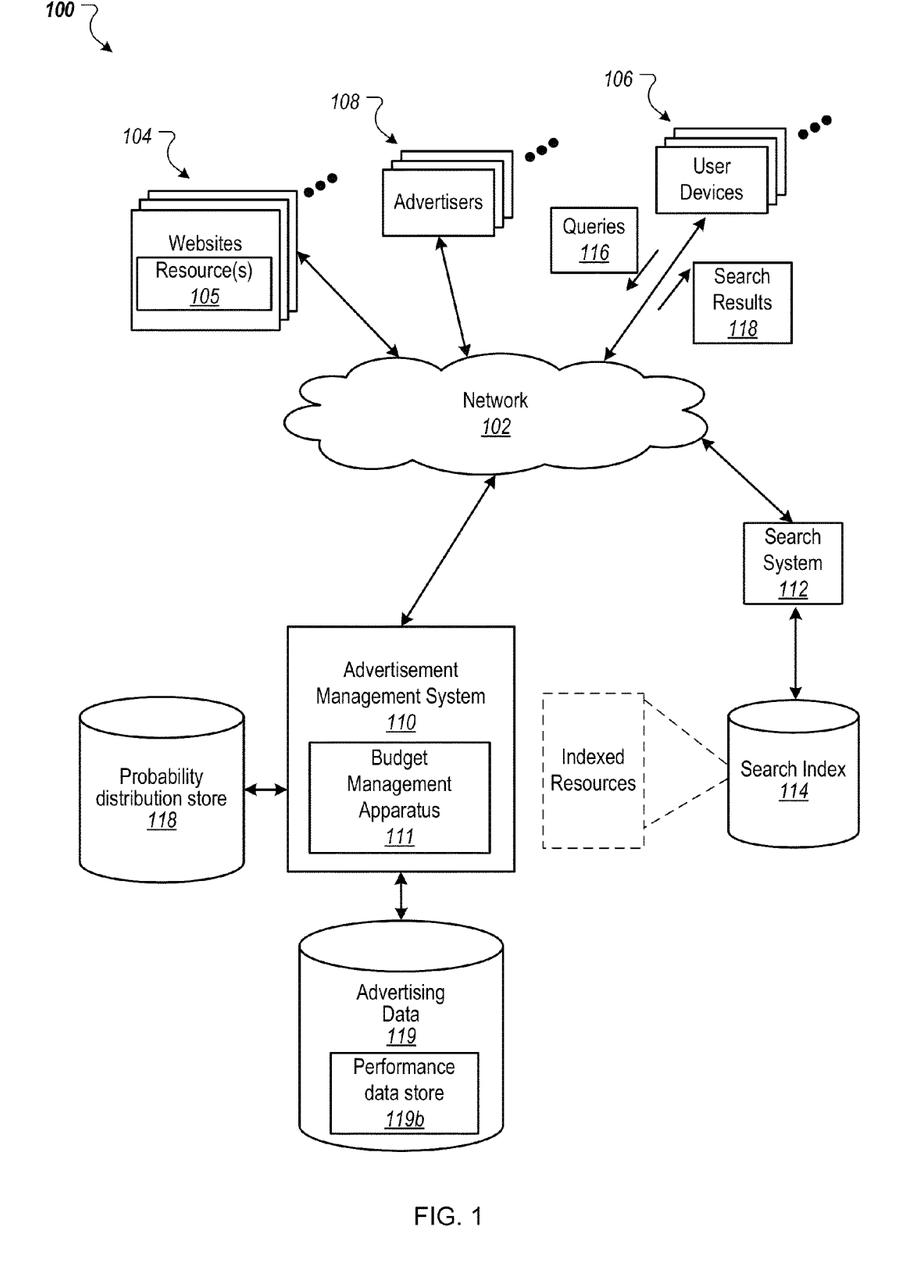
FIG. 1 is a block diagram of an example environment in which online content is distributed to user devices

FIG. 1 is a block diagram of an example environment 100 in which online content is distributed to user devices. The example environment 100 includes a network 102, such as a local area network (LAN), a wide area network (WAN), the Internet, or a combination thereof. The network 102 connects websites 104, user devices 106, advertisers 108, and the advertisement management system 110. The advertisement management system 110 includes a budget management apparatus 111. The example environment 100 can include many thousands of websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, portable document format (PDF) documents, images, video, and feed sources, to name only a few. The resources can include content, such as words, phrases, images and sounds, that can include embedded information (such as meta-information in hyperlinks) and/or embedded instructions (such as JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation of the resource 105 by the user device 106. The data representing the resource 105 can also include data specifying a portion of the resource or a portion of a user display (e.g., a presentation location of a pop-up window or in a slot of a web page) in which advertisements can be presented. These specified portions of the resource or user display are referred to as advertisement slots.

To facilitate searching of these resources 105, the environment 100 can include a search system 112 that identifies the resources 105 by crawling and indexing the resources 105 provided by the publishers on the websites 104. Data about the resources can be indexed based on the resource 105 to which the data corresponds. The indexed and, optionally, cached copies of the resources 105 are stored in a search index 114.

User devices 106 can submit search queries 116 to the search system 112 over the network 102. In response, the search system 112 accesses the search index 114 to identify resources that are relevant to the search query 116. The search system 112 identifies the resources in the form of search results 118 and returns the search results 118 to the user devices 106 in search results pages (i.e., resources in which search results are presented). A search result 118 is data generated by the search system 112 that identifies a resource that is responsive to a particular search query, and includes a link to the resource. An example search result 118 can include a web page title, a snippet of text or a portion of an image extracted from the web page, and the Uniform Resource Locator ("URL") of the web page. Search results pages can also include one or more advertisement slots in which advertisements can be presented.

When a resource 105 or search results 118 are requested by a user device 106, the advertisement management system 110 receives a request (e.g., a content item request) for content items (e.g., advertisements) to be provided with the resource 105 or search results 118. The advertisement management system 110 is a data processing apparatus that selects advertisements (or other content items) that are responsive to an advertisement request (or other content item request). For example, the advertisement management system 110 can include one or more ad servers that can select and/or distribute advertisements (or other content items) that are responsive to an advertisement request (or another content item request).

To facilitate selection of a responsive advertisement, the request for advertisements can include characteristics of the advertisement slots that are defined for the requested resource or search results page, and can be provided to the advertisement management system 110. For example, a reference (e.g., URL) to the resource for which the advertisement slot is defined, a size of the advertisement slot, and/or media types that are eligible for presentation in the advertisement slot can be provided to the advertisement management system 110. Similarly, resource keywords associated with (e.g., indexed according to, specified by code for, and/or stored with a reference to) a requested resource or a search query 116 for which search results are requested can also be provided to the advertisement management system 110 to facilitate identification of advertisements that are relevant to the resource or search query 116.

Using data included in the request for advertisements, the advertisement management system 110 selects advertisements that are eligible to be provided in response to the request ("eligible advertisements"). For example, eligible advertisements can include advertisements having characteristics (e.g., size and/or aspect ratio) matching the characteristics of advertisement slots and that are identified as relevant to specified resource keywords or search queries 116. In some implementations, advertisements having targeting keywords that match the resource keywords or the search query 116 are selected as eligible advertisements by the advertisement management system 110.

A targeting keyword can match a resource keyword or a search query 116 by having the same textual content ("text") as the resource keyword or search query 116. For example, an advertisement associated with the targeting keyword "hockey" can be an eligible advertisement for an advertisement request including the resource keyword "hockey." Similarly, the advertisement can be selected as an eligible advertisement for an advertisement request including the search query "hockey."

A targeting keyword can also match a resource keyword or a search query 116 by having text that is identified as being relevant to a targeting keyword or search query 116 despite having different text than the targeting keyword. For example, an advertisement having the targeting keyword "hockey" can also be selected as an eligible advertisement for an advertisement request including a resource keyword or search query for "sports" because hockey is a type of sport, and therefore, is likely to be relevant to the term "sports."

The advertisement management system 110 can select the eligible advertisements that are provided for presentation in advertisement slots of a resource or search results page based on results of an auction. For example, the advertisement management system 110 can receive bids from advertisers 108 and allocate the advertisement slots to the highest bidders at the conclusion of the auction. The bids are amounts that the advertisers 108 are willing to pay for presentation (or selection) of their advertisement with a resource or search results page. For example, a bid can specify an amount that an advertiser is willing to pay for each 1000 impressions (i.e., presentations) of the advertisement, referred to as a CPM bid. Alternatively, the bid can specify an amount that the advertiser is willing to pay for a selection (i.e., a click-through) of the advertisement or a conversion following selection of the advertisement. The highest bidders can be determined based on the bids alone, or based on the bids of each bidder being multiplied by one or more factors, such as quality scores derived from advertisement performance or landing page scores.

As described above, advertisers 108 can submit, to the advertisement management system 110, campaign parameters (e.g., targeting keywords and corresponding bids) that are used to control distribution of advertisements. Campaign parameters are parameters corresponding to a content distribution campaign that are used to control content selection in response to content requests. For example, campaign parameters can include targeting keywords and corresponding bids, geographic or demographic targeting criteria, as well as other parameters corresponding to a set of advertisements. Campaign parameters can also include a budget, which is a maximum amount (or range of amounts) of money an advertiser wants to spend on bids on targeting keywords. A campaign is a set of one or more advertisements and corresponding campaign parameters that are grouped together into a same advertising unit. For example, advertisements for sporting equipment can be grouped together into a campaign. Budgets can bet set on a monthly or daily basis for a specific advertisement or a group of advertisements, such as an advertisement campaign. The budgets can also be set based on a specific keyword or a group of keywords. Budgets can include a total amount of money, or more specific parameters, such as a maximum cost per click for a keyword.

The advertisers 108 can also access the advertisement management system 110 to monitor performance of the advertisements that are distributed using the campaign parameters. For example, an advertiser can access a campaign performance report that provides a number of impressions (i.e., presentations), selections (i.e., clicks), and conversions that have been identified for the advertisements. The campaign performance report can also provide a total cost, a cost-per-click, and other cost measures for the advertisement over a specified period of time.

The advertisement management system 110 can also store user interaction data with advertisements in a performance data store 119b. Data representing conditions under which advertisements were selected for presentation to a user, and user interaction data representing actions taken by users in response to presentation of the advertisement can be stored in a data store such a performance data store 119b. For example, when an advertisement is presented to the user, data can be stored in the performance data store 119b representing the advertisement impression. When a user selects (i.e., clicks) a presented advertisement, selection data is stored in the performance data store 119b representing the user selection of the advertisement. The data can also store information relating to user selections that lead to conversions. The data can also include the presentation of more than one advertisement to the user that led to the actions taken by the user.

For situations in which the systems discussed within this document collect personal information about users, the users may be provided with an opportunity to opt in/out of programs or features that may collect personal information (e.g., information about a user's demographics, past advertisement selection). In addition, user data may be anonymized in one or more ways before it is stored or used, so that personally identifiable information is removed. For example, a user's identity may be anonymized and/or encrypted so that the no personally identifiable information can be determined for the user, or a user's activities may be generalized (e.g., to a large group of users) where user activity information is obtained.

The interaction data can be used, for example, to determine carryover effects of advertisements that might not directly lead to a conversion. For example, statistical analysis of the interaction data might reveal that a baseline likelihood that a user performs an action that constitutes a conversion after clicking on an advertisement that was presented based on a particular keyword being matched (e.g., a baseline conversion rate for the particular keyword). The statistical analysis might also reveal a value by which the baseline likelihood increases when the advertisement is presented to a user subsequent to another (or the same) advertisement being provided to the user in response to a different keyword being matched. The increase to the baseline likelihood is referred to as the carryover effect for the different keyword.

Not taking into account carryover effects of targeting keywords and/or advertisement presentations can result in incomplete analysis of an effectiveness of assigning bids to certain targeting keywords. For example, an advertisement that is presented in response to a first targeting keyword being matched can result in a subsequent search on a second targeting keyword for which a conversion rate is relatively high. In such an instance, the conversion rate of the second targeting keyword can depend on whether an advertisement has been presented in response to the first targeting keyword being matched. For example, the second targeting keyword might be less effective if a bid is not assigned to the first keyword (and/or an advertisement is not presented based on the first keyword being matched). Thus, bids for targeting keywords should be selected based, at least in part, on the carryover effects that are provided by the targeting keywords.

The advertisement management system 110 includes, or is in communication with, a budget management apparatus 111. The budget management apparatus 111 can include one or more servers (or other computing devices) that can select targeting keywords to which an advertising budget is allocated. The targeting keywords can be selected based, at least in part, on the carryover effects of the targeting keywords and/or a marginal value that is expected to be realized (directly and/or indirectly) by assigning a portion of the advertising budget to the targeting keyword.

In some implementations, the budget management apparatus 111 can select a proper subset of a candidate set of targeting keywords and corresponding bids that increase a conversion rate for a campaign, given a budget for the campaign. The candidate set of targeting keywords can include, for example, the targeting keywords that an advertiser has selected for one or more advertisements. As described in more detail below, the budget management apparatus 111 can consider carryover effect in determining to which keywords the budget should be allocated (e.g., which targeting keywords can result in an increased or maximum conversion rate). For example, the budget management apparatus 111 can select a particular candidate targeting keyword even though the particular candidate targeting keyword might not have a high click-through rate, selection rate or conversion rate.

In some implementations, the budget management apparatus 111 can select the subset of the candidate targeting keywords based on a probability distribution function that specifies a likelihood that a specified outcome (e.g., a conversion) will occur if a portion of the advertising budget is (or is not) allocated to the targeting keyword. For example, the budget management apparatus 111 can receive a probability distribution function for each of the candidate targeting keywords. The probability distribution function for each of the candidate targeting keywords can account for ads previously provided using other targeting keywords in the candidate set.

Using the probability distribution functions, the budget management apparatus 111 can select a final set of targeting keywords that provides at least a threshold likelihood (e.g., an absolute value, such as 30%, or a relative value, such as top ten likelihoods) of a specified outcome (e.g., conversion), with a total cost below a specified value (e.g., a budget). For example, the final set of targeting keywords can be a set of targeting keywords that together provide the highest conversion rate while not exceeding a specified advertising budget. In this example, the final set of targeting keywords can include at least one targeting keywords that might not directly provide a high conversion rate, but does have a high carryover effect, such that the conversion rates of other keywords in the final set are increased when the at least one targeting keyword is included in the final set.

The selection of keywords to allocate budgets considering carryover effects is described in more detail with reference to FIG. 2. An example data flow for allocating advertising budget is described with reference to FIG. 3.

Figure 2:
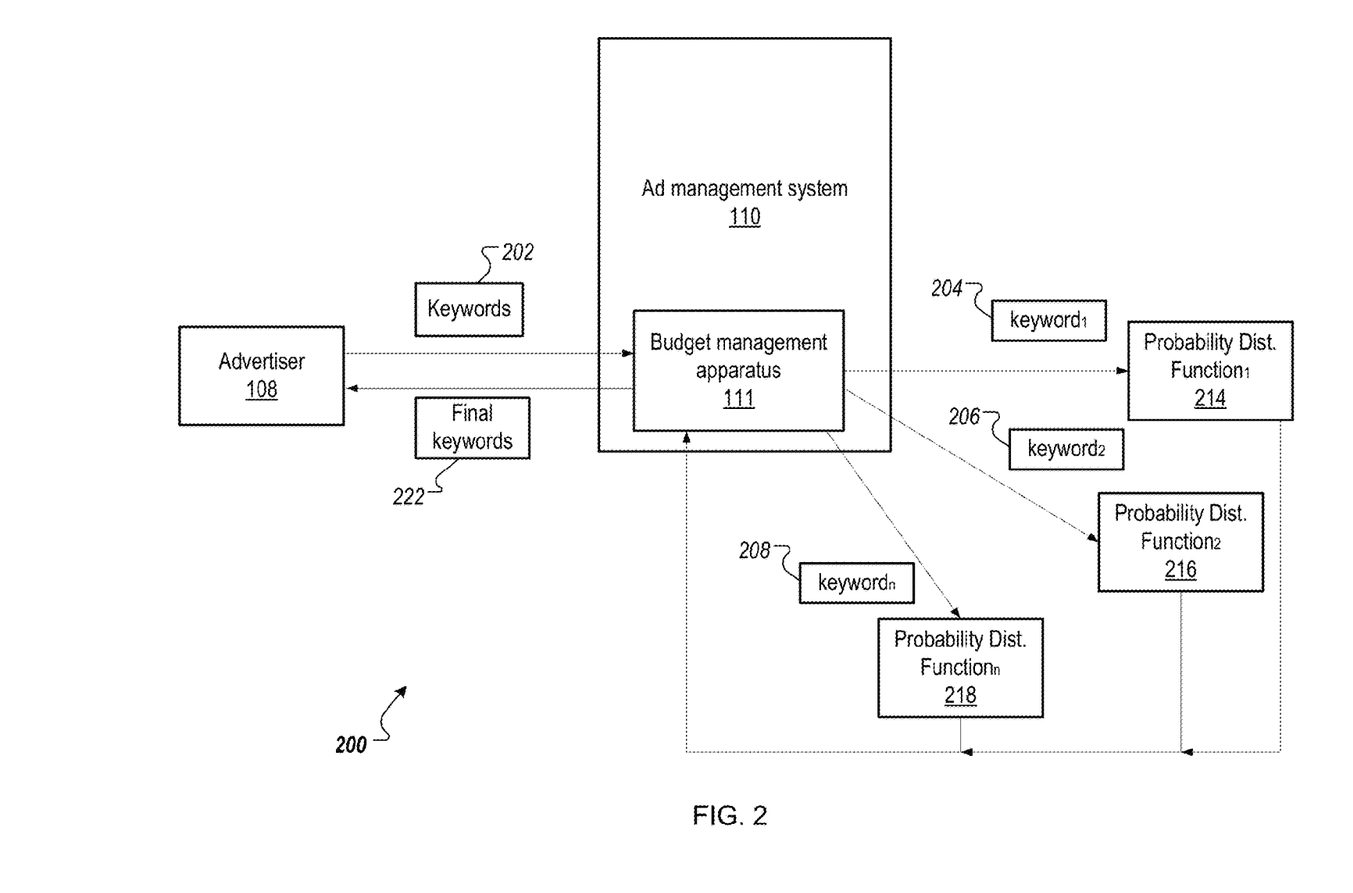
FIG. 2 is a block diagram of an example data flow for allocating advertising budgets.

FIG. 2 is a block diagram of an example data flow 200 for allocating an advertising budget among targeting keywords based, at least in part, on carryover effects of the targeting keywords. The data flow 200 begins with the advertisement management system 110 receiving a set of candidate keywords 202. The set of candidate keywords include targeting keywords that have been specified for an ad campaign by an advertiser. The advertisement management system 110 includes, or is in communication with, the budget management apparatus 111. The budget management apparatus 111 receives the candidate keywords from the advertisement management system 110. In some implementations, the budget management apparatus 111 can receive the candidate keywords 202 directly from the advertiser 108.

The budget management apparatus 111 receives a probability distribution function 214, 216, 218 for each of the targeting keywords 204, 206, 208 in the set of candidate keywords 202. Each of the probability distribution functions 214, 216, 218 models likelihoods of user actions occurring in response to targeting content items (e.g., targeting advertisements) using the targeting keywords 204, 206, 208, respectively. Each of the probability distribution functions 214, 216, 218 accounts for content items previously targeted using one or more other targeting keywords. For example, the probability distribution function 214 can be generated based on a statistical analysis of historical user action that follows presentation of advertisements associated with the targeting keyword 204.

Referring to the previous example, the set of candidate keywords can be for a BrandWidget advertising campaign by Example Retailer. Keyword1 204 can be, for example, "widgets." Keyword2 206 can be "Example Retailer." KeywordN 208 can be "BrandWidgets." While we discuss only three example targeting keywords, the set of candidate keywords 202 can include hundreds of targeting keywords or more.

The budget management apparatus 111 receives a probability distribution function 214 for keyword1 204, "widgets." The probability distribution function 214 models probabilities of actions a user can take in response to advertisements associated with the targeting keyword, "widgets." For example, based on previous user interactions, the probability distribution function 214 can specify actions and likelihoods with which users will take the actions if provided an advertisement that is targeted using the keyword 204. The actions can include, for example, user interaction with (e.g., clicking of) the advertisement and user conversion (e.g., purchasing of a widget). The actions can also include a subsequent search executed by the user, for example, including another targeting keyword (e.g., targeting keyword 206). The probability distribution function 214 can provide probabilities of the user actions being performed when different amounts are assigned as a bid for keyword1 204.

The probability distribution function 214 can be based, at least in part, on previous advertisements that have been provided to the user (e.g., based on other targeting keywords being matched). For example, the probability distribution function 214 can specify a likelihood that a user that is provided an advertisement in response the targeting keyword "widgets" being matched will submit subsequent search queries that match other targeting keywords (e.g., 206 and/or 208). The subsequent search queries can be search queries that match the targeting keyword "BrandWidgets," such that the presentation of the advertisement associated with "widgets" targeting keyword can have a carryover effect on to the advertisements associated with "BrandWidgets."

As described in more detail below, the probability distribution functions 214, 216, 218 corresponding to each of the targeting keywords 204, 206, 208, can be used to determine a benefit to the advertiser 108 of changing the amount allocated to the keywords 204, 206, 208. The budget management apparatus 111 can select a set of final keywords 222 with which advertisements associated with the advertiser 108 will provide at least a threshold likelihood of a specified outcome (e.g., conversion). The final keywords 222 can be keywords for which a total cost of distributing the advertisements is less than a specified value (e.g., a budget). The budget management apparatus 111 can provide the final keywords 222 to the advertiser 108. In some implementations, the budget management apparatus 111 can receive prior approval from the advertiser 108 to use the final keywords 222 and their associated bids.

Figure 3:
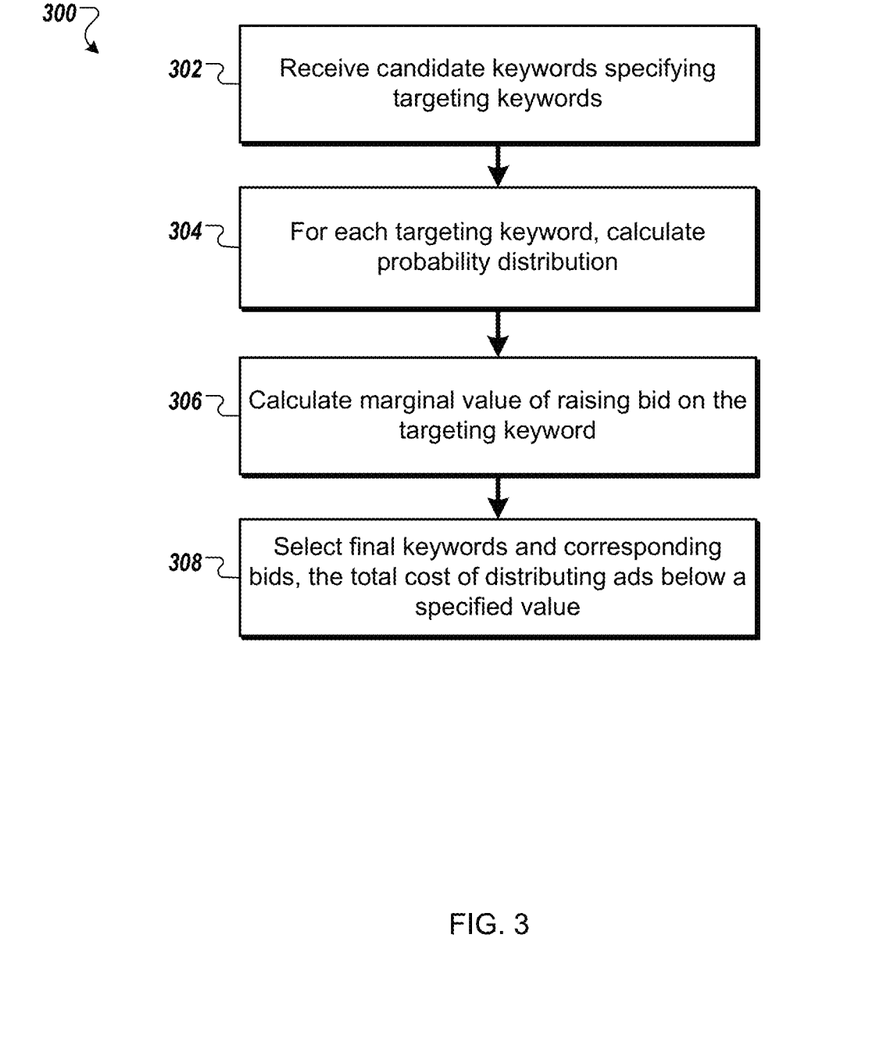
FIG. 3 is a flow chart of an example process for allocating advertising budgets considering carryover effects.

FIG. 3 is a flow chart of an example process 300 for allocating advertising budgets based, at least in part, on carryover effects of targeting keywords. The process 300 can be implemented, for example, by the advertisement management system 110 and/or the budget management apparatus 111 of FIG. 1. In some implementations, the advertisement management system 110 and/or the budget management apparatus 111 are each data processing apparatus that include one or more processors that are configured to perform actions of the process 300. In some implementations, the advertisement management system 110 is one or more data processing apparatus that includes the budget management apparatus 111. In some implementations, a tangible computer readable medium can include instructions that when executed by a computer cause the computer to perform actions of the process 300.

A set of candidate keywords specifying targeting keywords is received (302). The set of candidate keywords can be targeting keywords for a specific advertising campaign and/or a specific advertisement. The candidate keywords can also include initial corresponding bid amounts for each targeting keyword. Each targeting keyword is a phrase of one or more words that must be matched for the advertisement to be eligible to be provided in response to a content item request.

Candidate keywords can be received from an advertiser, along with other campaign parameters for the campaign associated with the candidate keywords. The campaign parameters can include a budget, which can provide a total cost limit for distributing advertisements targeted by the candidate keywords.

For each targeting keyword, a probability distribution is received (304). In some implementations, the probability distribution is a function that models user action in response to advertisements presented to the user. The presentation of the advertisements is dependent on the bid amounts for each targeting keyword. The probability distribution function takes into account carryover effect by analyzing the ad presentation history to the user. For example, the probability distribution function can be adjusted to model an increased likelihood of a particular action occurring when an advertisement was previously presented to the user.

In some implementations, the model can include user states, each user state capturing search queries submitted by the user and/or actions previously taken by the user. A finite space of user states can be represented by X, with each state in X being represented by x. The search queries can include search queries that match targeting keywords, and therefore, the actions taken by the user can include user interactions with advertisements associated with the targeting keywords that were provided in response to the search queries. The user states can also include a conversion state, represented by $x_c$, a non-conversion state $x_n$, and a final state, $x_f$.

The model can represent possible actions, or advertising levels, that can be taken by an advertiser at each state. Since each state represents a search query, the action can represent bid amounts for the targeting keywords that are matched by the search query. The finite set of possible actions for each state x can be represented by A(x). In some implementations, A(x) can be {advertise, do not advertise}. Alternatively, A(x) can include more levels of advertising corresponding to different bid amounts. For example, A(x) can include different threshold bid values (e.g., $1.00 per click) that an advertiser can assign to a targeting keyword.

The model can include transition probabilities between states, which depend on the amount of advertising the user has been exposed to at each state. The transition probabilities can be represented as $P_{xay}$, which represents the probability a user moves from state x to state y if advertising level a is chosen. The cost of advertising at level a in state x can be represented by d(x, a).

The model can be considered a constrained Markov Decision Process (MDP), where the reward function to be maximized r(x, a) is C for $x=x_c$ and 0 otherwise. Thus, the reward C only applies for conversion and the conversion rate is to be maximized. The budget allocation problem can be defined as $$\max_{u \in U} R(\beta, u)$$
$$\text{s.t.} \quad D(\beta, u) \leq V$$

where R is the expected total reward, D is the expected total cost, β is the initial flow of users (normalized to 1 to represent a probability measure), u is a general policy defining bid amounts for corresponding targeting keywords, and V is the budget constraint. For example, D can be a cost per click for all bids on all targeting keywords multiplied by an expected total clicks on all ads based on the targeting keywords. V can be a maximum dollar amount that an advertiser is willing to spend on an advertising campaign.

Marginal value of raising a bid on the targeting keyword is calculated (306) for each targeting keyword. In some implementations, the modeled MDP problem can be solved by calculating the marginal values of raising advertising levels. For example, the modeled MDP problem can specify an amount of expected increased revenue that can be realized by increasing a bid level for a particular keyword. The MDP problem can be implemented, for example, as follows:

```
δ* ⇐ +∞
m* ⇐ +∞
for every x ∈ X' such that m(x) > 1 do
```

-continued

```
for every m ∈ [1, m(x) − 1] do
    Δ ⇐ d(x, a_{m(x)}) − d(x, a_m)
```

$$\delta \Leftarrow -\frac{\sum_{y \in X'} (P_{xm_{a(x)}y} - P_{xa_m y})\pi_i(y) - \lambda_i \Delta}{\sum_{y \in X'} (P_{xm_{a(x)}y} - P_{xa_m y})d\pi_i(y) - \Delta}$$

```
    if δ < δ* then
        δ* ⇐ δ
        m* ⇐ m
        x* ⇐ x
    end if
    end for
end for
Return (x*, δ*, m*)
```

In the example method, m is a set of numbers representing the advertising level. Δ is a marginal cost, as $d(x, a_{m(x)})$ is the cost of advertising at a new level m(x) compared to the cost $d(x, a_m)$ of advertising at a current level m. δ is a marginal value, summing the increase in probability of a user going from state x to state y with the change in advertising level. $\pi_i(y)$ is the probability of being on state y. λ is a Lagrange multiplier for the budget constraint. The Lagrange multiplier can be implemented as $$\min_{\pi,\lambda} \sum_{x \in X'} \beta(x)\pi(x) + \lambda V$$

$$\text{s.t.} \quad \lambda \geq 0,$$

$$\pi(x) \geq r(x, a) - \lambda d(x, a) + \sum_{y \in X'} P_{xay}\pi(y),$$

$$\forall x \in X', a \in A$$

Here, any fixed value of λ, π(x) can be thought of as the optimal value function in the Markov model $M_\lambda$ with adjusted rewards $r_\lambda(x)=r(x,a)-\lambda d(x,a)$. Thus, a maximum marginal value is obtained by computing a marginal cost for each increase in advertising level. An increase in transition probabilities is computed for each state, multiplied by the probability the user is on the state to begin with. The increase in cost is subtracted from the increase in transition probabilities, including the transition probability to a conversion state. Dividing that by its derivative provides the increase in value.

The model can be trained using historical search data. For example, the values for state and transition probabilities can be derived from past search history data. For example, initial values can be selected and back tested against historical user responses. Adjustments can be made to the values so that the probabilities more accurately model the historical data.

Final keywords and corresponding bids are selected (308). In some implementations, the final keywords are selected such that the total cost of distributing advertisements (or other content items) associated with the keywords is below a specified value. For example, the final keywords and the bids that are assigned to each of the final keywords can be selected so that the total cost of distributing the advertisements is below an advertiser specified advertising budget.

In some implementations, using the linear programs described above provides a set of keywords and corresponding bid amounts that provide a threshold expected return on investment (ROI) (e.g., a maximum expected ROI among combinations of bids on targeting keywords) for an advertising budget. The final keyword set can provide the highest probability for conversion for a given total cost, accounting for carryover effects the targeting keywords have on each other.

Figure 4:
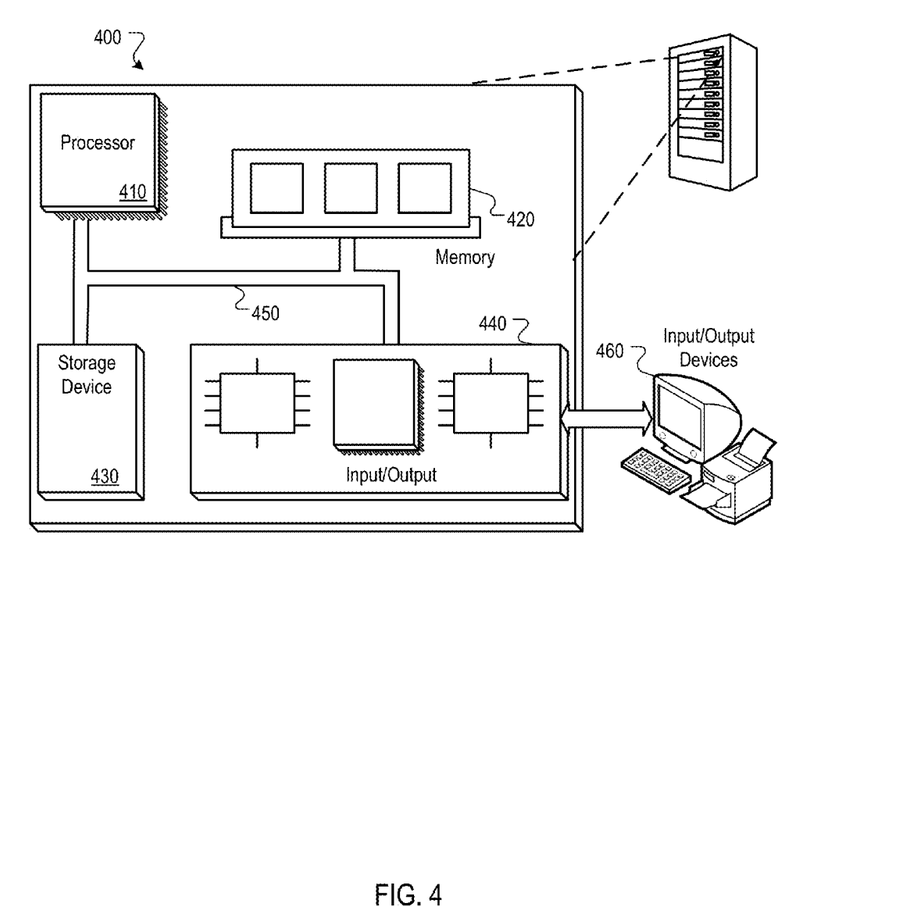
FIG. 4 is block diagram of an example computer system that can be used to allocate advertising budgets considering carryover effects.

FIG. 4 is block diagram of an example computer system 400 that can be used to track user interactions, as described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, for example, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non volatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving, at a data processing apparatus having a processor configured by executing instructions therein from a content distributor over a network, a set of candidate keywords specifying targeting keywords for one or more content items, each targeting keyword being a phrase to be matched for a content item to be eligible to be provided in response to a content item request;
   receiving, by the configured processor, for each of the targeting keywords, a probability distribution specifying likelihoods of specified user actions occurring in response to a content item being distributed, wherein the content item distributed based, at least in part, on the targeting keyword being matched by a content item request; including, in the probability distribution for each of the targeting keywords, a carry-over effect which represents the effect of distributing the content item based on the targeting keyword on the likelihood that the specified user actions will occur in response to the content item being subsequently distributed based on one or more other targeting keywords in the set of candidate keywords;
   selecting, by the configured processor, based on the probability distribution for each of the targeting keywords and the carry-over effect included in the probability distribution for each of the targeting keywords, a set of final keywords with which distribution of the one or more content items will be controlled, the set of final keywords being a plurality of keywords for which a likelihood of a specified outcome occurring exceeds a threshold likelihood, and the set of final keywords being a set of the candidate keywords for which a total cost of distributing the content items is below a specified value, wherein selecting candidate keywords to include in the set of final keywords based on the carry-over effect includes:
      determining, from the carry-over effect included in the probability distribution for a particular candidate keyword, that distributing the content item based on the particular candidate keyword increases the likelihood that the specified user actions will occur in response to the content item being subsequently distributed based on one or more other targeting keywords in the set of candidate keywords,
      adding the particular candidate keyword to the set of final keywords; and
   providing, by the configured processor over the network, an advertisement that is targeted using the final set of keywords.

2. The method of claim 1, wherein selecting a set of final keywords comprises selecting a set of final keywords that, based on the probability distributions, will provide at least a threshold conversion rate.

3. The method of claim 1, further comprising:
   computing, based on at least the carryover effect included in the probability distribution, a marginal value that will result in response to increasing a bid amount for at least one of the candidate targeting keywords, wherein computing the marginal value that will result in response to increasing the bid amount including:

calculating, a cost associated with an increase in the bid amount, determining, based on the probability distribution of the at least one candidate targeting keyword, a probability that the content item will be distributed based on the at least one of the candidate keywords;

determining, based on the carry-over effect an increase in the likelihood that the specified user actions will occur in response to the content item being first distributed based on the at least one of the candidate targeting keywords and subsequently distributed based or one or one or more other targeting keywords in the set of final keywords;

calculating the marginal value for the increased bid amount as a function of the determined increase in the likelihood of the specified user actions, and the cost associated with the increased bid amount and the probability that the content item will be distributed based on the at least one of the candidate keywords; and wherein, selecting the set of final keywords comprises selecting the at least one of the candidate keywords that will result in a highest marginal value.

4. The method of claim 1, further comprising:

selecting, based on the probability distribution, corresponding bid amounts for each of the selected final keywords, the step of selecting corresponding bid amounts including: for each of the selected final keywords, determining, based on the probability distribution of a particular final keyword, a probability that the content item will be distributed based on the particular selected final keyword;

determining, based on the carry-over effect associated with the particular final keyword, an increase in the likelihood that the specified user actions will occur in response to the content item being distributed based on one or one or more other keywords in the set of final keywords after being distributed based on the particular final keyword; and calculating a corresponding bid amount for the particular final keyword as a function of the determined increase in the likelihood of the specified user actions, and the probability that the content item will be distributed based on the particular selected final keyword.

5. The method of claim 1, wherein receiving a probability distribution comprises receiving data indicating a likelihood that a user performs a conversion following presentation of an advertisement that is provided based, at least in part, on the targeting keyword being matched by a search query.

6. The method of claim 5, wherein the likelihood that the user performs the conversion is based, at least in part, on whether the user was previously presented with an advertisement in response to a different targeting keyword being matched by a search query.

7. The method of claim 1, further comprising:

receiving a content item request that includes data that match a keyword in the final set of keywords.

8. The method of claim 7, further comprising:

determining a user state for a user for which the content item request was received, the user state specifying at least one search query that was previously submitted by the user; and determining, based on the at least one search query specified in the user state and at least the carry-over effect included in the probability distribution associated with the at least one search query, the likelihood of the specified outcome occurring following presentation of an advertisement that is targeted using the keyword in the final set of keywords; and generating a corresponding bid amount for the keyword based the likelihood of the specified outcome determined from at least the carry-over effect.

9. The method of claim 1, wherein selecting a set of final keywords comprises:

determining for each of a plurality of proper subset of the set of candidate keywords, a marginal value that will be provided by selecting the proper subset as the set of final keywords; and selecting, as the set of final keywords, the proper subset that provides a highest marginal value.

10. The method of claim 1, wherein selecting candidate keywords to include in the set of final keywords based on the carry-over effect includes: determining that the likelihood of a specified outcome occurring exceeds the threshold likelihood, and the cost of distributing the content items is below the specified value.

11. A non-transitory computer storage medium encoded with a computer program, the program comprising instructions that when executed by data processing apparatus cause the data processing apparatus to perform operations comprising:

receiving, from a content distributor, a set of candidate keywords specifying targeting keywords for one or more content items, each targeting keyword being a phrase to be matched for a content item to be eligible to be provided in response to a content item request;

receiving, for each of the targeting keywords, a probability distribution specifying likelihoods of specified user actions occurring in response to a content item being distributed based, at least in part, on the targeting keyword being matched by a content item request;

including, in the probability distribution for each of the targeting keywords, a carry-over effect which represents the effect of distributing the content item based on the targeting keyword on the likelihood that the specified user actions will occur in response to the content item being subsequently distributed based on one or more other targeting keywords in the set of candidate keywords; and selecting, based on the probability distribution for each of the targeting keywords and the carry-over effect included in the probability distribution for each of the targeting keywords, a set of final keywords with which distribution of the one or more content items will be controlled, the set of final keywords being a plurality of keywords for which a likelihood of a specified outcome occurring exceeds a threshold likelihood, and the set of final keywords being a set of the candidate keywords for which a total cost of distributing the content items is below a specified value, wherein selecting candidate keywords to include in the set of final keywords based on the carry-over effect includes:

determining, from the carry-over effect included in the probability distribution for a particular candidate keyword, that distributing the content item based on the particular candidate keyword increases the likelihood that the specified user actions will occur in response to the content item being subsequently distributed based on one or more other targeting keywords in the set of candidate keywords;

adding the particular candidate keyword to the set of final keywords; and providing, by the configured processor over the network, an advertisement that is targeted using the final set of keywords.

12. A system comprising:
one or more computers operable to perform operations including:
receiving, from a content distributor, a set of candidate keywords specifying targeting keywords for one or more content items, each targeting keyword being a phrase to be matched for a content item to be eligible to be provided in response to a content item request;
receiving, for each of the targeting keywords, a probability distribution specifying likelihoods of specified user actions occurring in response to a content item being distributed based, at least in part, on the targeting keyword being matched by a content item request;
including, in the probability distribution for each of the targeting keywords, a carry-over effect which represents the effect of distributing the content item based on the targeting keyword on the likelihood that the specified user actions will occur in response to the content item being subsequently distributed based or one or more other targeting keywords in the set of candidate keywords;
selecting, based on the probability distribution for each of the targeting keywords and the carryover effect included in the probability distribution for each of the targeting keywords, a set of final keywords with which distribution of the one or more content items will be controlled, the set of final keywords being a plurality of keywords for which a likelihood of a specified outcome occurring exceeds a threshold likelihood, and the set of final keywords being a set of the candidate keywords for which a total cost of distributing the content items is below a specified value,
wherein selecting candidate keywords to include in the set of final keywords based on the carry-over effect includes:
determining, from the carry-over effect included in the probability distribution for a particular candidate keyword, that distributing the content item based on the particular candidate keyword increases the likelihood that the specified user actions will occur in response to the content item being subsequently distributed based on one or more other targeting keywords in the set of candidate keywords;
adding the particular candidate keyword to the set of final keywords; and;
providing an advertisement that is targeted using the final set of keywords.

13. The system of claim 12, wherein selecting a set of final keywords comprises selecting a set of final keywords that, based on the probability distributions, will provide at least a threshold conversion rate.

14. The system of claim 12, further comprising:
computing, based on at least the carry-over effect included in the probability distribution for at least one of the candidate targeting keywords, a marginal value that will result in response to increasing a bid amount for each of the at least one of the candidate targeting keywords, wherein computing the marginal value that will result in response to increasing the bid amount including:
calculating, a cost associated with an increase in the bid amount,
determining, based on the probability distribution of the at least one candidate targeting keyword, a probability that the content item will be distributed based on the at least one of the candidate keywords;
determining, based on the carry-over effect an increase in the likelihood that the specified user actions will occur in response to the content item being first distributed based on the at least one of the candidate targeting keywords and subsequently distributed based or one or one or more other targeting keywords in the set of final keywords;
calculating the marginal value for the increased bid amount as a function of the determined increase in the likelihood of the specified user actions, and the cost associated with the increased bid amount and the probability that the content item will be distributed based on the at least one of the candidate keywords; and
wherein, selecting the set of final keywords comprises selecting the at least one of the candidate keywords that will result in a highest marginal value.

15. The system of claim 12, further comprising:
selecting, based on the probability distribution, corresponding bid amounts for each of the selected final keywords, the
determining, based on the probability distribution of a particular final keyword, a probability that the content item will be distributed based on the particular selected final keyword;
determining, based on the carry-over effect associated with the particular final keyword, an increase in the likelihood that the specified user actions will occur in response to the content item being distributed based on one or one or more other keywords in the set of final keywords after being distributed based on the particular final keyword; and
calculating a corresponding bid amount for the particular final keyword as a function of the determined increase in the likelihood of the specified user actions, and the probability that the content item will be distributed based on the particular selected final keyword.

16. The system of claim 12, wherein receiving a probability distribution comprises receiving data indicating a likelihood that a user performs a conversion following presentation of an advertisement that is provided based, at least in part, on the targeting keyword being matched by a search query.

17. The system of claim 16, wherein the likelihood that the user performs the conversion is based, at least in part, on whether the user was previously presented with an advertisement in response to a different targeting keyword being matched by a search query.

18. The system of claim 12, further comprising:
receiving a content item request that includes data that match a keyword in the final set of keywords; and
providing an advertisement that is targeted using the final set of keywords.

19. The system of claim 18, further comprising:
determining a user state for a user for which the content item request was received, the user state specifying at least one search query that was previously submitted by the user; and
determining, based on the at least one search query specified in the user state and at least the carry-over effect included in the probability distribution associated with the at least one search query, the likelihood of the specified outcome occurring following presentation of an advertisement that is targeted using the keyword in the final set of keywords; and\
generating a corresponding bid amount for the keyword based on the likelihood of the specified outcome determined from at least the carry-over effect.

20. The system of claim 12, wherein selecting a set of final keywords comprises:
- determining for each of a plurality of proper subset of the set of candidate keywords, a marginal value that will be provided by selecting the proper subset as the set of final keywords; and
- selecting, as the set of final keywords, the proper subset that provides a highest marginal value.

* * * * *